Oct. 16, 1956 — O. H. SCHUCK — 2,766,954
AUTOMATIC NAVIGATING AND LANDING APPARATUS FOR AIRCRAFT
Filed Dec. 11, 1950 — 6 Sheets-Sheet 1

Inventor
OSCAR HUGO SCHUCK
George H. Fisher
Attorney

Oct. 16, 1956    O. H. SCHUCK    2,766,954
AUTOMATIC NAVIGATING AND LANDING APPARATUS FOR AIRCRAFT
Filed Dec. 11, 1950    6 Sheets-Sheet 2

INVENTOR.
OSCAR HUGO SCHUCK
BY
George H. Fisher
ATTORNEY

Oct. 16, 1956 — O. H. SCHUCK — 2,766,954
AUTOMATIC NAVIGATING AND LANDING APPARATUS FOR AIRCRAFT
Filed Dec. 11, 1950 — 6 Sheets-Sheet 4

FIG. 4

INVENTOR.
OSCAR HUGO SCHUCK
BY
George H. Fisher
ATTORNEY

Oct. 16, 1956   O. H. SCHUCK   2,766,954
AUTOMATIC NAVIGATING AND LANDING APPARATUS FOR AIRCRAFT
Filed Dec. 11, 1950   6 Sheets-Sheet 5

INVENTOR.
OSCAR HUGO SCHUCK
BY
George H. Fisher
ATTORNEY

United States Patent Office 2,766,954
Patented Oct. 16, 1956

2,766,954

AUTOMATIC NAVIGATING AND LANDING APPARATUS FOR AIRCRAFT

Oscar Hugo Schuck, Minneapolis, Minn., assignor to Minneapolis-Honeywell Regulator Company, Minneapolis, Minn., a corporation of Delaware Application December 11, 1950, Serial No. 200,165

11 Claims. (Cl. 244—77)

This invention relates to the field of aircraft control apparatus, and comprises an improvement on that shown in my copending application filed June 17, 1948, Serial No. 33,608. In that application there is shown a flight control apparatus for causing a craft to follow a predetermined path with respect to the surface of the earth. The path is divided into a number of sections, each of which is served by a pair of radio transmitters at a known location. The craft carries receivers giving outputs, determined by the signals from the two transmitters, which vary with the distance and bearing of the craft from the location of the transmitters. The craft also carries a computer which determines from these outputs, and from inputs settable in accordance with the location of the transmitter and the location and direction of the path, the deviation of the craft from the desired path and from a scheduled position along the path. The heading of the craft is automatically adjusted in accordance with the former deviation, and its air speed in accordance with the latter. The computer also determines the distance of the craft from its destination—the arbitrarily selected "way point" between each two sections of the flight is considered a destination—and the apparatus is readjusted for control from a new set of transmitters when each destination is reached. When the craft has reached the end of its flight, control is transferred manually from the computer to the usual instrument landing apparatus. The unidirectional cross-pointer voltages are applied to the automatic pilot of the craft through a pair of coupling units which convert the signals to A. C. required in the aileron and rudder channels to control the heading of the craft and in the elevator channel to control its altitude. The cross-track deviation signal of the craft in its cruising condition also passes through the localizer coupler, to take advantage of the rate and gain circuits therein comprised.

It is the nature of the instrument landing beam to give the same receiver signal when the craft departs from the beam by any particular angular amount measured at the transmitter regardless of whether the craft is close to the transmitter, and hence only a few yards from the center of the beam, or remote from the transmitter, and hence perhaps thousands of yards from the center of the beam. If, however, the signal can be modified in accordance with the distance of the craft from the transmitter, such an uncertainty can be avoided: that is accomplished in the present invention.

The craft may be caused to change from horizontal to gliding flight either by changing the elevator position for the same air speed, or by changing the air speed for the same elevator position: both expedients are known in the art. In my copending application referred to above the air speed of the craft is adjusted by operation of a suitable control member to maintain the craft on its schedule, while control of the altitude of the craft during the final glide is through adjustment of elevators by the instrument landing receiver. Simplification of the apparatus can be accomplished by controlling the glide of the craft through adjustment of its air speed, and this also is done in the present invention.

An object of this invention is to provide improved aircraft control apparatus of the class described above, in which there is an automatically selected final section of the flight where azimuth control of the craft is in accordance with the localizer signal and the distance signal, and altitude control of the craft through airspeed adjustment is in response to glide path signal.

Another object of the invention is to provide improved aircraft control apparatus of this type, in which means are included for automatically transferring supervision of the heading of the craft from a set of bearing and distance transmitters to a set of distance and localizer transmitters, the normal inputs representative of the direction of the path, its location, and the location of the radio transmitters being simultaneously reduced to zero.

Another object of the invention is to porvide aircraft control apparatus of this type, in which means are included for automatically transferring control of the throttles of the craft from the set of bearing and distance transmitters to a glide path transmitter, the normal inputs representative of the direction of the craft, its location, and the location of the radio transmitters being simultaneously reduced to zero.

A more detailed object of the invention is to modify the computer of the airborne apparatus so that the lateral control signal is in accordance with the distance of the craft from the transmitter and its deviation from the center of the beam.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

The terms "omnidirectional range," "distance measuring equipment" and "instrument landing system" refer to specific radio units known in the art by those names. The omnidirectional range is described in the January 1942 issue of the "RCA Review," volume 6, No. 3, pages 344 to 369. The distance measuring equipment is described in the report of the "Third Commonwealth and Empire Conference on Radio for Civil Aviation, 1945," pages 197 to 205. The principles and characteristics of the instruments making up an instrument landing system are discussed in the Technical Development Reports Nos. 35 and 36 of the Civil Aeronautic Administration, entitled "The CAA-RTCA Instrument Landing System."

Figures 1, 8:
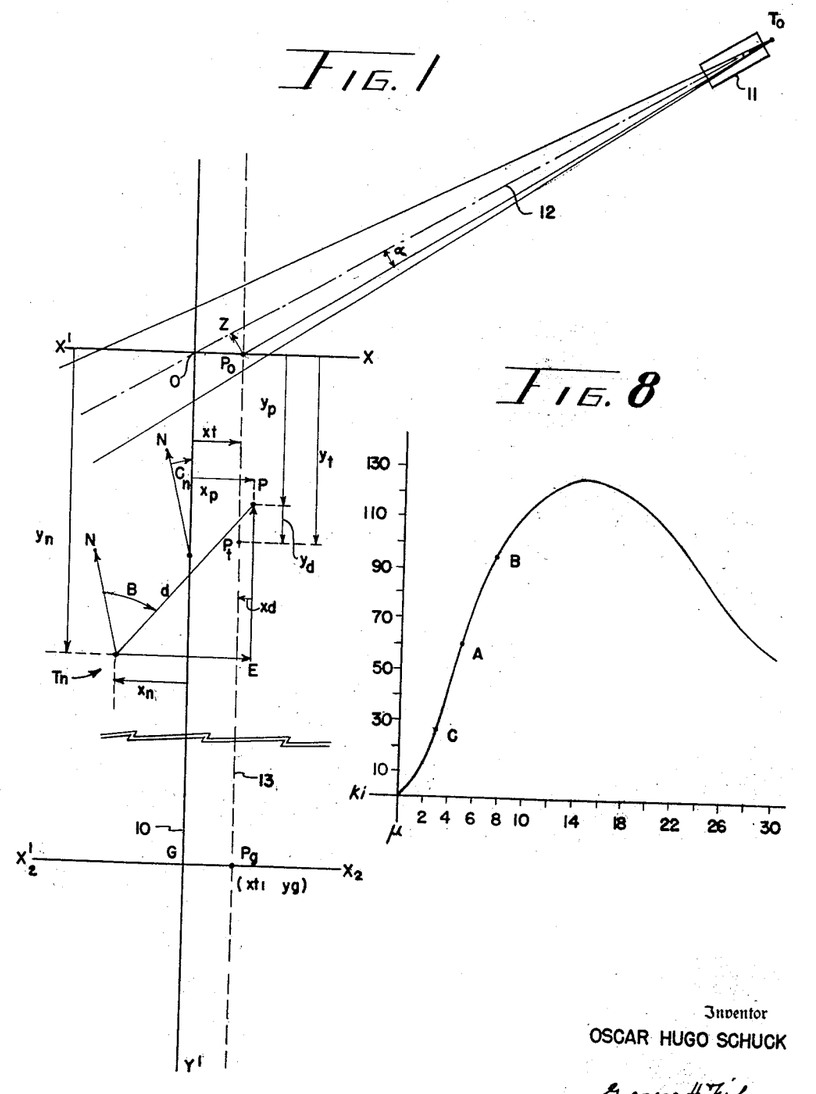
Figure 1 is a sketch illustrative of the problem which is to be solved by the invention.
Figure 8 is a diagram explanatory of the apparatus of Figure 7.

Referring now to Figure 1, the center line of an air lane is shown at 10. For the purposes of this specification the line 10 may be assumed to be a straight line, and its geographic bearing is shown to be 14° measured clockwise from north in the conventional fashion, as indicated at $C_N$. To the east of the lane is located an airport 11, which is equipped with the localizer and glide path transmitters of the instrument landing system and the responder of a distance measuring equipment installation, both located at $T_0$. The center line 12 of the localizer beam from transmitter $T_0$ has the direction shown relative to the center line 10 of the air lane, and intersects it at O. For illustrative purposes the distance $\overline{OT_0}$ may be assumed to be thirty miles.

Located along the air lane at roughly 100 mile intervals are a series of radio stations, each including an omnidirectional range transmitter and a distance measuring equipment responder. One such station is shown at $T_n$. The problem here is for an aircraft to be guided in the directions of lines 10 and 12 to a safe landing at the airport 11, and the following description and general analysis is pertinent to this problem, but not necessarily to the problem of a craft proceeding along the air lane and not stopping at airport 11.

A set of Cartesian coordinates is superimposed on the terrain just described, with its Y-axis coincident with the line 10 and its X-axis passing through point O. Radio station $T_n$ is located on this set of axes by its abscissa $x_n$ and its ordinate $y_n$.

Measuring backward along the line 10, a point G is located such that $y_n$ is roughly one half of $y_g$: the distance $y_g$ is made 100 miles when possible, for convenience in operation.

If an aircraft leaves the way-point G at an assigned time and proceeds at an assigned speed, it has a "scheduled" position at any instant thereafter. The craft does not have to move along line 10, however, but may follow an assigned line 13 parallel to line 10 from some point $P_g$ to point $P_0$. In general, the scheduled position of the craft may be represented by the point $P_T$ having coordinates $x_t$ and $y_t$. The point $P_g$ is called a "way-point": it may be the point of origin of the flight or a point passed through in a more extended flight.

Actually the craft is seldom able to follow exactly its scheduled course: its actual position at any instant is indicated by the point P whose coordinates are $x_p$ and $y_p$. It is evident that any error in the craft's scheduled position has the value $(y_p - y_t)$, or $y_d$, and that any cross-track error has the value $(x_p - x_t)$, or $x_d$. The quantities $x_d$ and $y_d$ may be used to indicate the amount of correction in the heading and airspeed respectively needed to bring the craft to its scheduled position on the line 13, but in order to obtain $x_d$ and $y_d$, the values of $x_t$, $y_t$, $x_p$, and $y_p$ must be determined.

The values of $x_p$ and $y_p$ are obtained from the signals received from the transmitter at station $T_n$. As is more fully explained below, the signal from the omnidirectional range receiver varies with the bearing B of the craft from the transmitter, and the signal from the distance measuring equipment receiver varies with the distance $d$ of the craft from the responder.

The following mathematical relations hold in Figure 1:

$$x_p = x_n + \overline{T_nE}$$
$$\overline{T_nE} = d \cos \angle PT_nE$$
$$y_p = y_n + \overline{EP}$$
$$\overline{EP} = d \sin \angle PT_nE$$
But $\angle PT_nE = (90° + C_n - B)$ measured counterclockwise from the direction $T_nE$ according to standard mathematical practice. Hence $$x_p = x_n + d \cos (90° + C_n - B) \quad (1)$$
and $$y_p = y_n + d \sin (90° + C_n - B) \quad (2)$$
Accordingly
$$x_d = x_n + d \cos (90° + C_n - B) - x_t \quad (3)$$
and $$y_d = y_n + d \sin (90° + C_n - B) - y_t \quad (4)$$

Equations 1 to 4 form the basis of the navigating computer of this specification, and are discussed in detail in my copending application referred to above.

It will be seen that as the craft moves upwardly as shown in Figure 1, the value of $y_p$ decreases until when $y_p$ equals 0 the craft is on the X-axis of the coordinates, at the point $P_0$. This point is displaced from line 12 by an angle $\alpha$ measured at $T_0$ from center line 12, and the localizer receiver gives an output proportional to $\alpha$. This output is the same as long as the craft is on the line $P_0T_0$, regardless of its distance from $T_0$. At a distance of ½ mile, the linear displacement of the craft from the center of the beam is 462 feet, and at a landing speed of 120 miles per hour there remains 15 seconds in which correction can be made, for an angular displacement $\alpha$ of 1°. At a distance of 5 miles the displacement of the craft from the center of the beam is 4620 feet, and 2½ minutes remain for maneuvering. Any control system adjusted to give critical damping at ½ mile from touchdown is over damped at large distances out, because the converging nature of the beam characterize the system by a varying "stiffness."

If a system is devised in which the craft's heading is controlled in accordance with the linear displacement of the craft from the beam rather than its angular displacement, the stiffness of the system is the same at all distances from the transmitter. This is a characteristic of a parallel signal beam: it may be obtained from a converging beam, according to the present invention, by solving the equation $$\overline{P_0Z} = \overline{T_0P_0} \sin \alpha$$

where $\overline{P_0Z}$ is the linear displacement of the craft from the beam center measured perpendicularly to the latter. A system controlling the craft in accordance with the distance $\overline{P_0Z}$ has an improved, more constant dynamic response than the conventional angular deviation responsive system.

To accomplish this a D. M. E. responder is added to the apparatus operating at transmitter $T_0$, to provide a signal that varies with $\overline{T_0P_0}$. If now zero values are used for $x_n$, $c_n$, and $x_t$ in Equation 3 and $\alpha$ is substituted for B, the equation becomes $$x_d = d \cos (90° - \alpha)$$
$$= d \sin \alpha \quad (5)$$

$d$ now being the distance along the line $\overline{T_0P_0}$ from $T_0$ to the craft. Thus the desired control is simply obtained.

Figure 2:
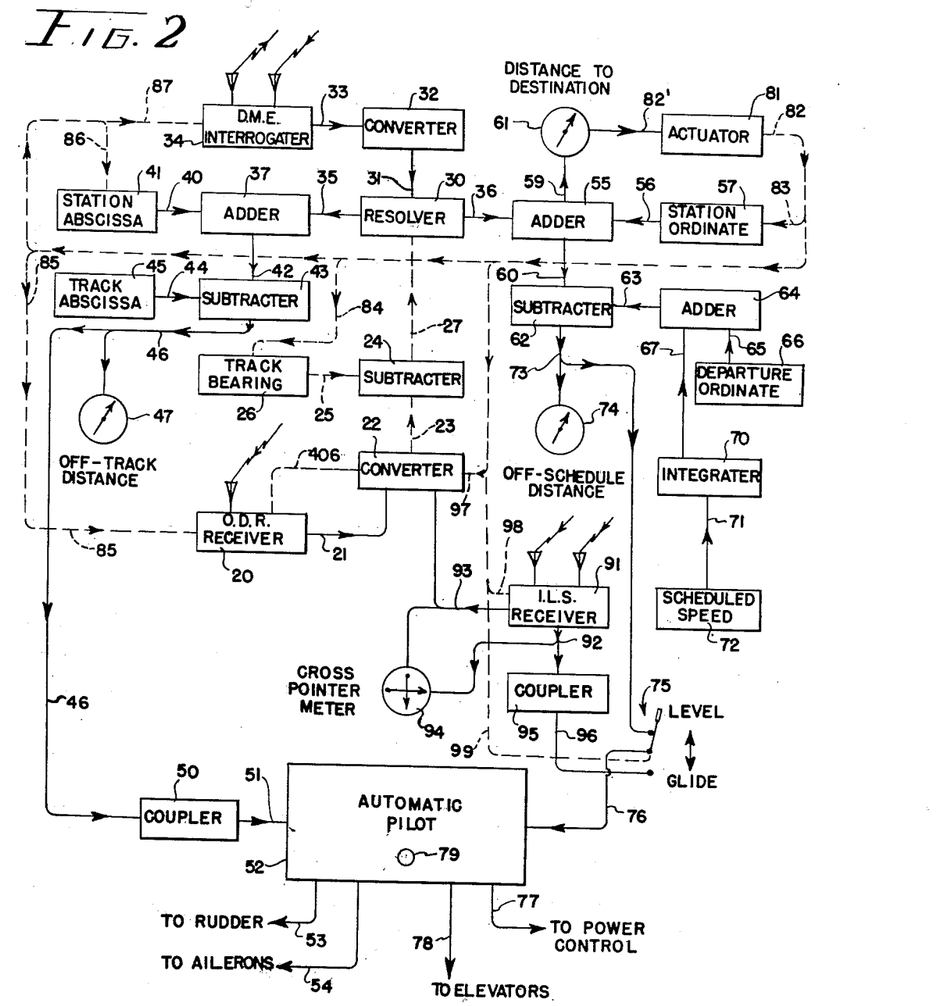
Figure 2 is a block diagram of apparatus according to the invention for solving the problem.

Reference should now be made to Figure 2, which comprises a functional diagram giving the general interrelationship of the components comprising my invention. Omnidirectional range receiver 20 is shown near the center of this figure as supplying an output 21 which varies in accordance with the angle B. This output is applied to a converter 22, and produces a mechanical signal 23 for a subtracter 24. A second mechanical signal 25, proportional to $(90° + C_1)$ is supplied to subtracter 24 from a track bearing selector 26. Subtracter 24 supplies a mechanical signal 27 to a resolver 30, the signal being proportional to $(90° + C_1 - B)$.

An electrical signal 31 is supplied to resolver 30 from a converter 32, in accordance with an electrical signal 33 from D. M. E. interrogator 34. The signal 31 is proportional to $d$. Resolver 30 gives two electrical output signals at 35 and 36 determined by the two inputs. Signal 35 is proportional to $d \cos (90° + C_1 - B)$, and is supplied to an adder 37: a second signal 40 proportional to $x_n$ is supplied to adder 37 from a station abscissa selecter 41.

Adder 37 supplies an electrical signal 42 proportional to $x_n + d \cos (90° + C_1 - D)$ to a subtracter 43, and a second signal 44, proportional to $x_t$, is supplied to subtracter 43 from a track abscissa selecter 45. The output 46 of subtracter 43 has the value $x_n + d \cos (90° + C_1 - D) - x_t$, which is $x_d$, and an off-track distance indicator 47 is actuated in accordance with this output. The same output 46 is applied to a coupler 50, which transforms it into a signal 51 suitable for injection into an automatic pilot 52, for use in controlling the rudder 53 and ailerons 54 of the craft to determine its heading and thereby control its lateral position.

The second signal 36 from resolver 30 is proportional to $d \sin(90° + C_1 - B)$, and is supplied to an adder 55: a second signal 56 proportional to $y_n$ is supplied to adder 55 from a station ordinate selector 57.

Adder 55 supplies a pair of electrical signals 59 and 60 each having the value $y_n + d \sin(90° + C_1 - B)$, which is $y_p$. The first of these signals is applied to a distance-to-destination indicator 61, and the second is supplied to a subtracter 62. A second input 63 is supplied to subtracter 62 from an adder 64. A first input 65 is supplied to adder 64 from a departure ordinate selector 66, and a second input 67 is supplied to adder 64 from an integrater 70 which is adjusted, as indicated at 71, to operate in accordance with the output of a scheduled speed selector 72 which is set in accordance with V, the scheduled speed of the craft. The output 63 from adder 64 accordingly is of the magnitude $y_o + \int V dt$, which is $y_t$.

The output 73 from subtracter 62 is of the magnitude $y_p - y_t$, which is $y_d$, and an off-schedule distance indicator 74 is actuated in accordance with the value of this output. This output is also supplied to a two-position switching device 75, and thence as at 76, to automatic pilot 52, for controlling the power of the craft as at 77. The automatic pilot includes further means shown at 78 for controlling the elevators of the craft, as well as a disengage button 79 for preventing the automatic pilot from affecting the operation of the craft.

When distance-to-destination indicator 61 is indicating 0, a circuit is completed for energizing an actuator 81 through a suitable connection 82'. Actuator 81 operates, through mechanical connections indicated by the branched, dotted line 82, to perform a plurality of functions in the apparatus. Thus by branch 83 actuator 81 operates station ordinate selector 57. By branch 84 actuator 81 operates track bearing selector 26. By branch 85 actuator 81 adjusts the tuning of O. D. R. receiver 20. By branch 86 actuator 81 operates station abscissa selector 41. By branch 87 actuator 81 adjusts the tuning of D. M. E. interrogator 34. Other branches of connection 82 will be described below.

Near the center of the drawing there is shown an I. L. S. receiver 91 which supplies a first output 92 proportional to $\theta$, the angular deviation of the craft vertically from a selected glide path, and a second output 93 proportional to $\alpha$, the angular departure of a craft from a selected localizer path in azimuth. Output 92 is supplied to the horizontal needle of a cross pointer meter 94, and output 93 is supplied to the vertical needle of cross pointer meter 94, as is conventional in I. L. S. apparatus generally. Output 92 is also supplied to a coupling unit 95, which transforms it to a signal output 96 suitable for use in automatic pilot 52; output 96 is supplied to switching device 75.

Output 93 is supplied to converter 22, and a branch 97 of mechanical connection 82 operates in converter 22 to select whether output 21 or output 93 determines the magnitude of output 23 of converter 22. Branch 98 of mechanical connection 82 adjusts the tuning devices in I. L. S. receiver 91. Branch 99 of mechanical connection 82 operates switching device 75.

Figure 3:
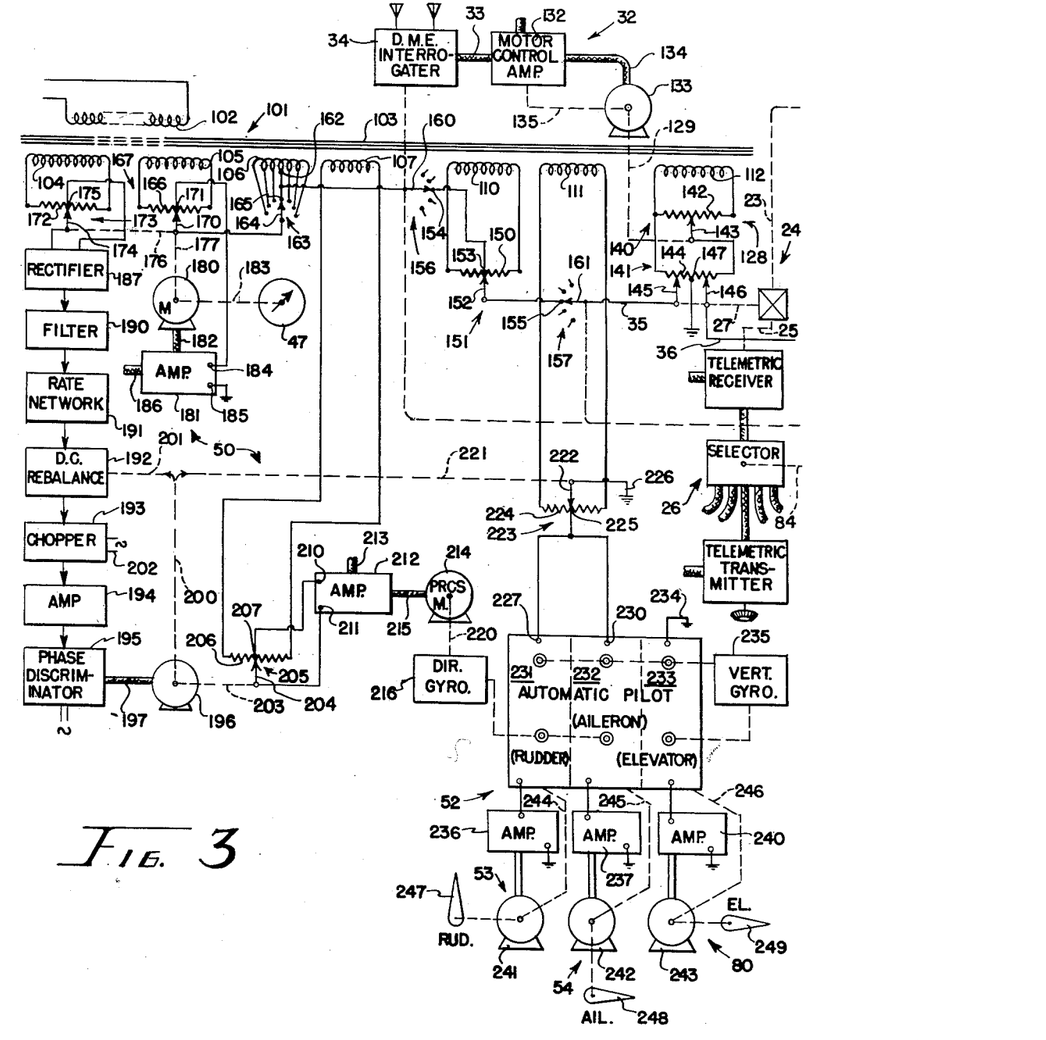
Figures 3 and 4 are a wiring diagram of the apparatus shown in Figure 2.
Figure 4:
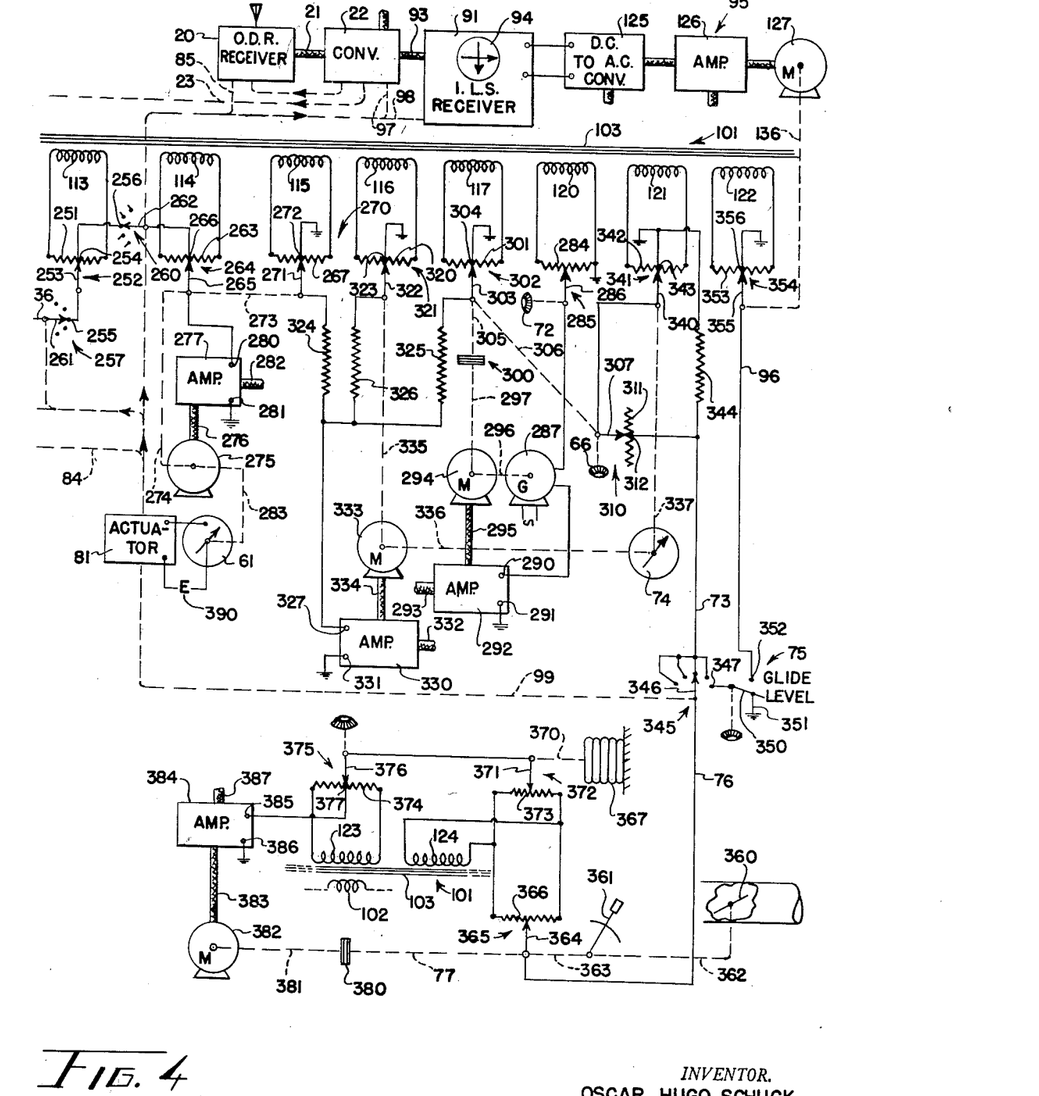

The dominant feature of Figures 3 and 4 is a transformer 101, which extends across the upper portion of both figures, and portions of which are also shown in the lower part of Figure 4. Primary winding 102 of transformer 101 cooperates with a core 103 to energize a plurality of secondary windings 104, 105, 106, 107, 110, 111, 112, 113, 114, 115, 116, 117, 120, 121, 122, 123 and 124. These secondary windings provide independent energization for various components of the apparatus as a whole, as will be described more fully below.

In the upper portion of Figure 4 O. D. R. receiver 20 is shown as energizing converter 22 through connection 21, and I. L. S. receiver 91 is shown as energizing converter 22 through connection 93, all as shown in Figure 2. I. L. S. receiver 91 is also shown as energizing coupler 95, which includes a D. C. to A. C. converter 125, a motor control amplifier 126 and a motor 127. The interrelationship between O. D. R. receiver 20, I. L. S. receiver 91, and converter 22 is shown more completely in Figures 5 and 8.

In the upper portion of Figure 3 D. M. E. interrogator 34 is shown as energizing converter 32 through connection 33. Converter 32 is shown to include a motor control amplifier 132 which energizes a motor 133 through a suitable connection 134. As better shown in Figure 5, mechanical feedback 135 is provided by which motor 133 may modify the operation of amplifier 132.

Motor 133 has a mechanical output 129 proportional to the distance $d$ from the craft to the D. M. E. responder, and corresponding to element 31 of Figure 2. Similarly coupler 22 has a mechanical output shaft 23 whose rotation is proportional to the angle B, and motor 127 has an output shaft 136 whose rotation is proportional to the angle $\theta$.

Secondary winding 112 is shown in Figure 3 as energizing network 128, which comprises a pair of voltage dividers 140 and 141. Voltage divider 140 includes a linear resistance winding 142 with respect to which a slider 143 is moved by mechanical connection 129 to motor 133. Voltage divider 140 forms part of converter 32. Voltage divider 141 includes a resistance winding 144, center tapped at 147, with respect to which a pair of sliders 145 and 146 are moved by mechanical connection 27 from adder 24, which in this case is shown to comprise a mechanical differential having as a first input shaft 23 and as a second input shaft 25. Voltage divider 141 is so constructed that as sliders 145 and 146 are moved simultaneously by rotation of shaft 27, with respect to winding 144, the voltages on the sliders vary respectively as the cosine and sine of the angular rotation of shaft 27. Suitable structure for performing this function is shown in complete detail in my copending application referred to above, and this showing will not be repeated here.

Secondary winding 110 energizes the winding 150 of a voltage divider 151 having a slider 152. Winding 150 is center tapped at 153. Any voltage difference between center tap 153 and slider 152 is impressed between fixed contacts 154 and 155 of tap switches 156 and 157 having switching arms 160 and 161 all respectively. Each tap switch is provided with a further plurality of fixed contacts, and it will be understood that associated with each further set of fixed contacts there is a further secondary winding similar to winding 110 and a further voltage divider similar to voltage divider 151. By this means operation of tap switches 160 and 161 makes it possible to select any one of a plurality of voltage dividers for providing an output to the switching arms of the switches. This arrangement is also described in my copending application referred to above.

Secondary winding 106 is divided into a number of equal portions by a plurality of taps including a center tap 162. The fixed taps on winding 106 are connected to fixed contacts on a tap switch 163 having a switching arm 164: center tap 162 of the winding is connected for example to fixed contact 165 of tap switch 163. Thus as switching arm 164 is moved from center tap 165 in either direction, its voltage with respect to the center tap increases in equal discrete steps.

Winding 105 is arranged to energize the winding 166 of a voltage divider 167 having a slider 170: winding 166 is center tapped at 171. In the same fashion winding 104 is arranged to energize the winding 172 of a voltage divider 173 having a slider 174, winding 172 being center tapped at 175.

Sliders 174 and 170 are arranged for unitary operation through mechanical connections 176 and 177 by the shaft of a motor 180 which operates under the control of an amplifier 181 through a cable 182. Off-track-distance indicator 47 is also actuated by motor 180 through a mechanical connection 183.

Motor 180 is of the well-known two phase type, in which a rotor is mounted for rotation in the field of a pair of stator windings. The stator windings are located in 90° physical quadrature, and are arranged for energization directly from the line and from the output of an amplifier respectively, the energizing currents being in phase quadrature. Operation of the motor takes place, as is well known to those skilled in the art, in a direction depending on which of the stator windings is energized with current in a leading phase with respect to the other.

Amplifier 181 is also of a well-known type, in which there is supplied at the output of the amplifier an amplified alternating voltage which is determined in phase and amplitude by the phase and amplitude of an alternating voltage applied to the input terminals 184 and 185 of the amplifier. The amplifier is energized from a suitable source of alternating voltage as indicated at 186, and voltage from this source is applied directly to the line-phase winding of motor 180 through cable 182. The amplifier phase winding of motor 180 is energized through amplifier 181 and cable 182 as well.

Voltage divider 173 comprises a portion of coupler 50, which also includes a rectifier 187, a filter 190, a rate network 191, a D. C. rebalancing arrangement 192, a chopper 193, an amplifier 194, a phase sensitive discriminator 195, and a motor 196 energized from discriminator 195 through a cable 197.

Discriminator 195 is a well-known arrangement which provides an alternating voltage output which is of a first phase if an input voltage is in phase with a comparison voltage, and which is of the opposite phase if the input voltage reverses with respect to the comparison voltage.

Rebalancing arrangement 192 includes a source of unidirectional voltage and means for adjusting the amount of this voltage made available in opposition to voltage supplied to the rebalancing arrangement from rate network 191: the adjustment of the unidirectional voltage is accomplished by motor 196 through mechanical connections 200 and 201.

Chopper 193 is a synchronously vibrating switch energized with alternating voltage as indicated at 202, and supplying at its output a square wave whose amplitude is determined by the magnitude of the D. C. voltage applied thereto, whose phase is determined by the polarity of the D. C. voltage supplied thereto, and whose frequency is determined by the frequency applied to the chopper at 202. Motor 196 is of the same type as motor 180 previously described, and amplifier 194 and phase discriminator 195 correspond to amplifier 181 as originally described. The shaft of motor 196 is continued as shown at 203 to operate the slider 204 of a voltage divider 205 having a winding 206 which is center tapped at 207. Winding 206 of voltage divider 205 is energized from secondary winding 107 of transformer 101.

Any voltage appearing between slider 204 and center tap 207 is impressed on the input terminals 210 and 211 of an amplifier 212 energized with alternating voltage at 213. Amplifier 212 energizes a precessing motor 214 through a connecting cable 215, and motor 214 is arranged to precess the directional gyroscope 216 of an automatic pilot 52 through a suitable mechanical connection 220. Amplifier 212 is of the same nature as amplifier 181 previously described, and motor 214 is like motor 180.

The shaft of motor 196 is also continued through mechanical connections 200 and 221 to drive the slider 222 of a voltage divider 223 having a winding 224 center tapped at 225. Winding 224 of voltage divider 223 is energized from secondary winding 111 of transformer 101, and any voltage appearing between slider 222 and center tap 225 is impressed between ground connection 226 and the input terminals 227 and 230 of the rudder channel 231 and aileron channel 232 of automatic pilot 52. Elevator channel 233 of the automatic pilot is provided with a separate ground connection 234.

In addition to the structure thus far described, automatic pilot 52 includes a vertical gyroscope 235, a plurality of amplifiers 236, 237 and 240, and a plurality of servomotors 241, 242 and 243 arranged to operate the rudder 247, ailerons 248, and elevators 249 of the craft respectively. Feedback connections 244, 245 and 246 between the motors and the channels of the automatic pilot are also included.

Secondary winding 113 of transformer 101 energizes the winding 251 of a voltage divider 252 having a slider 253; winding 251 is center tapped at 254. Any voltage appearing between slider 253 and center tap 254 is impressed between the fixed contacts 255 and 256 of a pair of tap switches 257 and 260 having switching contacts 261 and 262. It will be appreciated that another secondary winding similar to winding 113 and another voltage divider similar to divider 252 are supplied for each of the remaining sets of taps of the tap switches so that upon operating the switching arm different voltages can be supplied.

Secondary winding 114 of transformer 101 energizes the winding 263 of a voltage divider 264 having a slider 265: winding 263 is center tapped at 266. Secondary winding 115 of transformer 101 energizes the winding 267 of a voltage divider 270 having a slider 271: winding 267 is center tapped at 272. Sliders 271 and 265 are actuated simultaneously through mechanical connections 273 and 274 by a motor 275 which is energized through a cable 276 from a motor control amplifier 277 having input terminals 280 and 281 and a power connection 282. The shaft of motor 275 is continued at 283 to operate distance to destination indicator 61. Amplifier 277 is of the same nature as amplifier 181 previously described, and motor 275 is like motor 180.

Secondary winding 120 of transformer 101 energizes the winding 284 of a voltage divider 285 having a slider 286 which is manually adjustable. The voltage appearing on slider 286 is combined with the output of a velocity generator 287, and the result is impressed upon the input terminals 290 and 291 of an amplifier 292, having a power connection 293. Amplifier 292 energizes a motor 294 through a suitable cable 295, and the shaft of motor 294 is extended at 296 to drive velocity generator 287 and at 297 to one side of a friction clutch 300.

Amplifier 292 and motor 294 are like amplifier 181 and motor 180 previously described. Velocity generator 287 is a device, sometimes referred to as a dynamic transformer, which gives an output varying in phase in accordance with the direction in which a rotor comprised in the apparatus is driven, and varying in amplitude in accordance with the speed at which the rotor is driven: the frequency of the output remains the same regardless of the speed of the rotor.

Secondary winding 117 of transformer 101 is arranged to energize the winding 301 of a voltage divider 302 having a slider 303: winding 301 is center tapped at 304. Slider 303 is connected to the output of clutch 300 by a mechanical connection 305, which is extended at 306 to drive the slider 307 of a variable resistor 310 having a winding 311 with an intermediate tap 312. Slider 307 is independently adjustable by a manual knob 66.

Secondary winding 116 of transformer 101 is arranged to energize the winding 320 of a voltage divider 321 having a slider 322; winding 320 is center tapped at 323.

Sliders 271, 303, and 322 are connected through summing resistors 324, 325, and 326, to input terminal 327 of an amplifier 330 having a second input terminal 331 and a power connection 332, and energizing a motor 333 through a cable 334. Amplifier 330 and motor 333 are like amplifier 181 and motor 180 previously described.

The shaft of motor 333 is extended at 335 to actuate slider 322 of voltage divider 321, and is also extended at 336 to actuate off-schedule distance indicator 74, and further at 337 to actuate the slider 340 of a voltage divider 341 having a winding 342 center tapped at 343 and energized from secondary winding 121 of transformer 101. A load resistor 344 is associated with voltage dividers 310 and 341.

In the lower right hand portion of Figure 4 there is shown a tap switch 345 having a switching contact 346 and a plurality of fixed contacts, one of which indicated at 347 is independent, while the others are all connected together. Associated with fixed contact 347 is switching device 75, which comprises a switching contact 350, a grounded fixed contact 351 and a second fixed contact 352.

Secondary winding 122 of transformer 101 energizes the winding 353 of a voltage divider 354 having a slider 355; winding 353 is center tapped at 356.

The bottom portion of Figure 4 shows the air speed controlling portion of the apparatus. The throttle of the craft is shown at 360, and is actuated by a throttle lever 361 through a mechanical connection 362. Also actuated by throttle lever 361, through a mechanical connection 363, is the slider 364 of a voltage divider 365 having a winding 366. An air speed responsive device 367 is shown as actuating, through a mechanical connection 370, the slider 371 of a voltage divider 372 having a winding 373. Windings 366 and 373 are energized from secondary winding 124 of transformer 101.

Secondary winding 123 of transformer 101 energizes the winding 374 of a voltage divider 375 having a slider 376: winding 374 is center tapped at 377.

Slider 364 is actuated, through connection 77, a friction clutch 380, and a mechanical connection 381, by a motor 382. This motor is energized through a cable 383 from an amplifier 384 having input terminals 385 and 386 and a power connection 387. Amplifier 384 and motor 382 are like amplifier 181 and motor 180 previously discussed.

In the left central portion of Figure 4 there is shown actuator 81, which is energized from a suitable source of electrical energy 390 whenever distance-to-destination indicator 61 reaches an indication of 0 as previously pointed out. The detailed structure of actuator 81, and the specific means, suggested in Figures 3 and 4 by dashed lines, by which it performs the functions of selecting successively desired values of $x_n$, $y_n$, and $c_n$ are shown in my copending application referred to above. Branch 97 of the mechanical connection operated by actuator 81 is shown in the upper portion of Figure 4 as connected to converter 22 and branch 99 is shown in the lower portion of Figure 4 as actuating switching contact 346 of tap switch 345.

Figure 5:
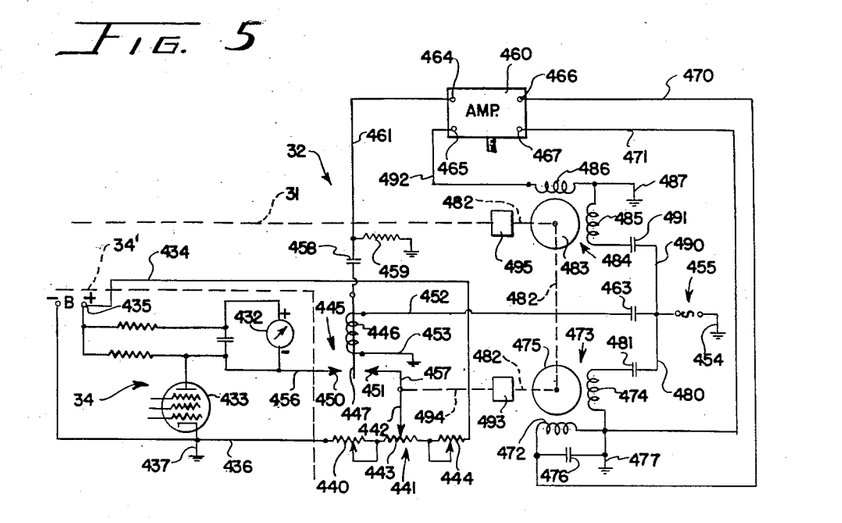
Figure 5 is a fragmentary showing of the distance measuring equipment interrogator, and includes the converter therefor.

Converter 32 is shown in Figure 5, with the related portions of interrogator 34. The output of the latter is conventionally a voltage applied to a high inpedance volt meter: the purpose of the converter is to derive from this voltage a shaft rotation proportional to the actual distance, without destroying the accuracy of the original system. The interrogator is shown at 34, below and to the left of the dotted line 34′, and the voltage in question is impressed on a meter 432, one side of which is connected to the plate of a pentode 433 and the other side of which is connected to the positive terminal 435 of the source of plate voltage. The resistance of the pentode is varied by voltages impressed on its control electrodes in accordance with the distance being measured, by means, not shown, provided therefor, and thus the voltage between the positive terminal of the power supply and the plate is also varied.

The derivation of the shaft rotation requires the use of an electric motor controlled by the interrogator. The most satisfactory method of motor control is one using a rebalancing or null type of network; such a network must be so designed that the measuring circuit will not be loaded down thereby to such an extent that its accuracy will be affected. This is accomplished according to the present invention by a camparison arrangement in which first the voltage at the meter and then a comparison voltage are applied to an amplifier of high input resistance, and the amplifier energizes a motor to adjust the comparison voltage to equality with the voltage being measured. The motor shaft rotation also comprises the mechanical output from the converter, since it is a measure of the comparison voltage, which in turn varies with the distance being measured.

In order to minimize the effect of change in the supply voltage, the comparison voltage is obtained from the same source. Thus, a conductor 434 is connected to the positive terminal 435 of the power supply and conductor 436 is connected to ground, and the negative terminal of the power supply, at 437. In series between these two conductors there are connected a first variable resistor 440, a voltage divider 441 having a slider 442 and a winding 443, and a second variable resistor 444. The values of resistors 440 and 444 are adjusted so that when meter 432 is at maximum reading the slider 442 is at the same potential as the negative terminal of the meter if the slider is at the left hand end of winding 443, and when meter 432 gives its minimum reading slider 442 is at the same potential as the meter terminal if at the right hand end of the winding: resistors 440 and 444 are thus centering means coordinating the range of slider 442 with the range of voltage available across pentode 433.

The converter includes a synchronously vibrating switch 445 having an actuating winding 446, a movable contact 447, and a pair of fixed contacts 450 and 451. Winding 446 is energized, through a conductor 452 and ground connections 453 and 454, from a source 455 of alternating voltage, to cause movable contact 447 to oscillate between fixed contacts 450 and 451 at the frequency of the source. Fixed contact 450 is connected to the negative terminal of meter 432 by a conductor 456, and fixed contact 451 is connected to slider 442 by conductor 457. The potential of movable contact 447 is thus alternated between that of fixed contact 450 and that of fixed contact 451, and if the two fixed contacts are not at the same potential a square wave alternating voltage of the frequency of source 455 appears upon movable contact 447, and is applied to an amplifier 460 through conductor 461 and ground. Operation of movable contact 447 is brought into a desired phase relationship with the voltage of source 455 by means of a phasing capacitor 463. Conductor 461 includes a blocking capacitor 458, and a grounded resistor 459 cooperates with capacitor 458 to complete the input circuit to the amplifier for alternating voltage.

Amplifier 460 is of the type in which a voltage is obtained at output terminals 466 and 467 which is of the same phase, positive or negative, and the same frequency as the voltage applied to input terminals 464 and 465. The output voltage is impressed by conductors 470 and 471 upon one winding 472 of a two-phase motor 473 having a second winding 474 and a rotor 475. The power factor of the motor may be improved by the addition of a capacitor 476 across winding 472. Winding 474 is energized from source 455 through ground connections 477 and 454, and conductor 480 and phasing capacitor 481.

Unitary on the shaft 482 of rotor 475 is the rotor 483 of a "velocity generator" or dynamic transformer 484. Members 473 and 484 of Figure 5 correspond to motor 133 of Figure 3. Generator 484 has a primary winding 485 and a secondary winding 486, the former being energized from source 455 through ground connections 454 and 487, and conductor 490 and phasing capacitor 491. Winding 486 is connected in the input circuit of amplifier 460, which may be traced from terminal 464 through conductor 461, capacitor 458, movable contact 447, fixed contact 450, (or 451), pentode 433 (or slider 442, a portion of winding 443, and variable resistor 440), ground connections 437 and 487, winding 486, and conductor 492 to input terminal 465.

The shaft 482 of motor 475 is connected through reduction gearing 493 to a shaft 494 which actuates the slider 442 along winding 443. Input shaft 31 to the computer is also coupled to rotor shaft 482, through reduction gearing 495.

So long as fixed contacts 450 and 451 are at the same potential, regardless of its actual magnitude, no square wave alternating voltage is impressed on the input of amplifier 460. Winding 472 of motor 473 remains unenergized, and neither shaft 494 nor shaft 31 is rotated. This is the normal or balanced condition of the converter.

If the potential at the plate of pentode 433 changes, as by reason of a change in the distance being measured, the potential of fixed contact 450 changes while that of fixed contact 451 remains the same, and a square wave alternating voltage is impressed on amplifier 460. The amplifier applies the amplified fundamental component of the square wave, which is of the same frequency as the source 455 and in phase or 180° out of phase with it, to winding 472 of motor 473. An alternating voltage of the same frequency but in phase quadrature is continuously impressed on the winding 474 through conductor 480. Under these conditions a rotating field is set up, as is well known to those skilled in the art, and rotor 475 begins to turn, its direction of rotation being determined by the phase of the voltage applied to winding 472. Shaft 494 is driven to adjust the position of slider 442 in a direction to make the potential of fixed contact 451 equal to that of fixed contact 450. Simultaneously rotor 483 of velocity generator 484 is driven, inductively supplying in the input circuit to the amplifier a voltage of the frequency of the source and of an amplitude depending upon the rate of movement of rotor 483. This voltage is phased to oppose that causing the operation of the motor, to give anti-hunt and smoothing action. When fixed contact 451 assumes the same potential as fixed contact 450, the input to amplifier 460 returns to zero, and operation of motor 473 ceases.

It is obvious that if fixed contact 450 takes a higher potential than fixed contact 451, the square wave impressed on amplifier 460 is of a first phase relation, while if the potential of fixed contact 450 decreases, the square wave is of the opposite phase. After passing through the amplifier the resulting voltage on winding 472 leads or lags the quadrature voltage on winding 474, and hence operation of motor 473 is reversible. From this and the foregoing explanation it follows that the rotated position of shaft 31 is proportional to the distance being measured, and that this proportionality is maintained, regardless of change in the distance, without influencing the accuracy of the distance measurement.

The omnidirectional range comprises in effect a transmitter and a receiver for emitting and responding to a high frequency carrier upon which are impressed a sinusoidal low voltage modulation and a keyed impulse voltage. At the transmitter an antenna array is so energized that the maxima of intensity of the carrier rotate in azimuth about the antenna at the low frequency. The impulse voltage is transmitted when the positive maximum of the carrier is due north of the transmitter, so that in any other direction from the transmitter there is an interval between the instant of reception of the pulse and the instant when the carrier reaches its peak value. The function of the ominidirectional range receiver is to respond to this interval by giving an indication of the direction of the receiver from the transmitter.

Such portions of the structure of the omnidirectional range receiver as are necessary to an understanding of the present invention are shown above the dotted line 20' in Figure 6. The principal components of the receiver are a phase splitting bridge 503, a universal phase shifter 504, a pair of pentodes 505 and 506, and an indicator 507 which is esseintially a D. C. voltmeter with a center zero reading. The receiver, not shown, demodulates the carrier and the low frequency modulation is fed to an automatic gain control circuit and a filtering amplifier. The output of the filtering amplifier, representing the sinusoidal modulation of the carrier at the transmitter, appears between conductors 510 and 511 in Figure 6. The received impulse voltage appears between conductors 512 and 513, the latter being grounded. Coupling capacitors 514 and 515 and conductors 516 and 517 impress the filtered low frequency modulation signal upon the input terminals 520 and 521 respectively of phase splitting bridge 503, which comprises a pair of fixed capacitors 522 and 523 forming opposite arms of the bridge, and a pair of resistors 524 and 525 forming the remaining arms of the bridge. In order to permit adjusting the bridge so that the voltage at its output terminals 526 and 527 is 90° out of phase with the voltage on its input terminals, resistors 524 and 525 are made adjustable as at 530. Voltages from terminals 520, 521, 526, and 527 of the phase splitting bridge are made available to the other portions of the system, not here described, by conductors 531 and 532, 533 and 534, 535, and 536, respectively.

Figure 6:
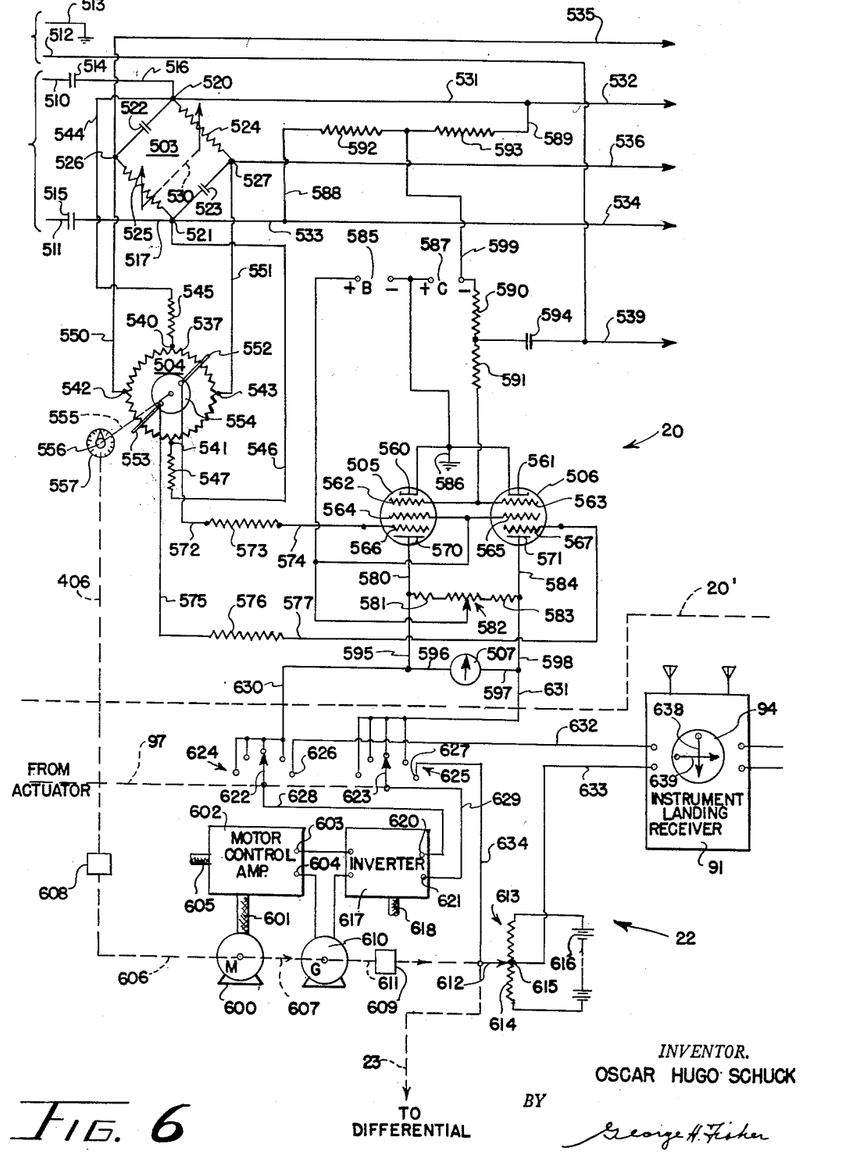
Figure 6 is a fragmentary showing of the omnidirectional range receiver, and includes the converter therefor as well as showing its relation to the instrument landing system receiver.

The output of phase splitting bridge 503 is impressed upon universal phase shifter 504 in order to provide a voltage which may vary in phase through 360°. Phase shifter 504 comprises an endless resistance winding 537 tapped at four equally spaced points 540, 541, 542 and 543. Input terminal 520 of bridge 503 is connected to tap 540 of phase shifter 504 by conductor 544 and resistor 545, terminal 521 to tap 541 by conductor 546 and resistor 547, and terminals 526 and 527 to taps 542 and 543 by conductors 550 and 551. The voltage between terminals 527 and 526 is thus in quadrature with that between terminals 520 and 521.

Movable unitarily with respect to winding 537 are a pair of mutually insulated sliders 552 and 553 carried by a suitable member 554 driven by a shaft 555 for rotation by operation of a manual knob 556; a scale 557 is provided for indicating the rotated position of knob 556. The arrangement is such that when slider 552 is in contact with tap 540 and slider 553 is in contact with tap 541, the voltage between sliders 552 and 553 is in phase with the voltage between conductors 510 and 511. When these sliders are rotated clockwise from this position the phase angle of the voltage between them relative to the input voltage varies continuously, becoming 90° when the sliders engage contacts 543 and 542 respectively, 180° when the sliders engage contacts 541 and 540 respectively, and 270° ( or —90°) when the sliders engage contacts 542 and 543 respectively. Accordingly as member 554 rotates in either direction from the position where slider 552 contacts tap 540, the voltage between sliders 552 and 553 varies in phase from a phase angle of zero continuously through 360° of phase angle.

This continuously variable voltage is supplied to pentodes 505 and 506, comprising respectively cathodes 560 and 561, control grids 562 and 563, screen grids 564 and 565, suppressor grids 566 and 567, and plates 570 and 571. Slider 552 is connected to suppressor grid 566 of pentode 505 by conductor 572, resistor 573 and conductor 574: similarly, slider 553 is connected to suppressor grid 567 of pentode 506 by conductor 575, resistor 576 and conductor 577. Plate 570 of pentode 505 is connected to plate 571 of pentode 506 by conductor 580, a resistor 581, a voltage divider 582, a resistor 583, and conductor 584, and positive plate potential is applied to the slider of voltage divider 582, and to screen grids 564 and 565, from a suitable source 585, the negative terminal of which is grounded at 586, as are cathodes 560 and 561. Bias voltage from a source 587 is supplied to the control grids 562 and 563 through a pair of resistors 590 and 591, and to the suppressor grids 566 and 567 through phase shifter 504, bridge 503, conductors 588 and 589, a pair of resistors 592 and 593, and conductor 599.

The impulse voltage is applied to control grids 562 and 563 of the pentodes through ground connections 513 and 586 and through conductor 512, capacitor 594, and resistor 591, and is also made available to other portions of the system by a conductor 539. The impulse voltage provides a fixed point in time with which comparison of the output voltage of the phase shifter 504 is to be made; the latter voltage is applied to the pentode suppressor grids in opposite phase relation, while the impulse voltage is applied on the control grids of the pentodes in the same phase relation. When the phase shifter in a craft located due north of the transmitter is set at zero the pulse coincides with the positive peak of voltage on one suppressor grid, say that of pentode 505, and the negative peak of voltage on the other grid. If the phase shifter is rotated through 180° the pulse coincides with the positive peak of the voltage on the suppressor grid of pentode 506, and the negative peak of the voltage on the suppressor grid of pentode 505. With a unidirectional anode voltage and with suitable grid bias voltages, the arrangement causes the pentodes to discharge equally when the phase shifter is at 90° and 270°, moving from a maximum discharge of 505 and a minimum discharge of pentode 506 when the phase shifter is at zero, through a maximum discharge of pentode 506 and a minimum discharge of pentode 505 when the phase shifter is at 180°.

Indicator 507 is connected between the plates of the pentodes by conductors 580, 595, and 596 and conductors 597, 598, and 584. When the pentodes discharge equally the indicator is at its central zero position: if pentode 505 discharges more than pentode 506, the needle of the indicator swings to the left, while if pentode 506 discharges more than pentode 505, the needle swings to the right. In other words, the voltage between conductors 595 and 598 is a unidirectional voltage of variable magnitude and reversible polarity.

If the craft is north of the transmitter, the pulse and the voltage peak are received at the same time. For indicator 507 to give an on-course or center-zero indication, phase shifter 504 must be set to give a 90° phase shift between input and output. This corresponds to the "North" indication of knob 556 on scale 557. If the craft is east of the transmitter, the impulse precedes the voltage peak by an interval corresponding to 90° of the low frequency. Adjustment of phase shifter 504 to delay the voltage peak by 90° causes the pentodes to again discharge equally. The instrument was designed to be used by setting the phase shifter knob to the angle from which it is desired to approach the station, and then to fly the craft so that the indicator reading remains zero.

If means can be provided whereby shaft 555 is driven always to such a position that indicator 507 reads zero, the position of the shaft is then a measure of the bearing of the craft from the transmitter. This adaptation of the omnidirectional range receiver is what converter 22 is designed to perform, and to this end the converter is electrically and mechanically connected to receiver 20, as shown in the portion of Figure 6 below the dotted line 20'.

Converter 22 comprises a motor 600 energized through a cable 601 from an amplifier 602 having input terminals 603 and 604 and a power connection 605. The shaft of motor 600 acts through a mechanical connection 606 and reduction gearing 608 to rebalance the omnidirectional range receiver by adjusting the position of sliders 552 and 553, and is also extended at 607 to drive a velocity generator 610, and at 611 to actuate through reduction gearing 609 the slider 612 of a voltage divider 613 having a winding 614 center-tapped at 615. Winding 614 is energized from a battery 616 or some other suitable source of unidirectional electrical energy. The shaft of motor 600 is further extended at 23 to perform the functions shown in Figures 2, 3, and 4.

The input to amplifier 602 includes the output of velocity generator 610 and the output of an inverter 617, having a power cable 618 and a pair of input terminals 620 and 621 energized through conductors 628 and 629 from the switching contacts 622 and 623 of a pair of tap switches 624 and 625. Contact 626 of switch 624 and contact 627 of switch 625 are independent. The remaining contacts of each tap switch are connected together, those of switch 624 being further connected by conductors 630 and 596 to one side of indicator 507, and those of switch 625 being connected by conductors 631 and 597 to the other side of the indicator. In all but the final position of actuator 81, which corresponds to the most clockwise position of switches 624 and 625, inverter 617 is energized with unidirectional voltage from indicator 507, and supplies an alternating voltage output which reverses in phase and varies in amplitude with reversal in the polarity and variation in the magnitude of the unidirectional voltage. Such devices are well known. This output, combined with the anti-hunt output of velocity generator 610, is impressed on motor-control amplifier 602 and results in forward or reverse operation of motor 600. Sliders 552 and 553 are adjusted in position so as to reduce the reading of indicator 507 to zero: when this occurs, operation of motor 600 ceases. Sliders 552, 553, and 612 remain in the positions to which they have been driven, and the rotation of shaft 23 is a measure of the bearing of the craft from the omnidirectional range transmitter. As the position of the craft changes, sliders 552 and 553 and 614, and shaft 23 are correspondingly adjusted.

The instrument landing system provides the pilot with a straight line glide path beam and a runway localizer beam. Indicator 94, best shown in Figure 6, is provided to guide the pilot in following the two beams, and consists of two crossed needles 638 and 639. The normally vertical needle 638 supplies a visual indication of the lateral position of the aircraft with respect to the center of the localizer beam. The normally horizontal needle 639 shows the relationship of the aircraft to the glide path beam. When the aircraft is properly positioned on the approach path, the needles of the indicator are crossed at the center of the instrument.

The detailed operation of the instrument landing system is not of significance here and it need only be remembered that whenever the craft is on one side of a localizer beam, say the north side of an east-and-west beam, the vertical needle is deflected to the left of its center zero position by a unidirectional voltage of a first polarity, while if the craft is on the other, south, side of the beam, the needle is deflected to the right by a voltage of the opposite polarity. This is independent of the heading of the craft. As the craft moves away from the center of the beam, the unidirectional output voltage becomes greater until at about 2½ degrees, measured at the localizer transmitter, full scale deflection of the indicator is reached. The useful "width" of the beam is thus five degrees.

Similarly, when the craft is above the desired glide path the horizontal needle is deflected upwardly, moving through its full-scale deflection during departure of the craft upward from the desired path by an angle of .3 degree at the glide path transmitter. If the craft is below the center of the beam the horizontal needle is deflected downwardly, moving through its full scale deflection when the craft moves to .5 degree. The useful "width" of the beam in elevation is therefore .8 degree.

In the final position of actuator 81, inverter 617 is energized with unidirectional voltage from I. L. S. receiver 91 through conductor 632, switch contact 626, switching arm 622, and conductor 628, and through conductor 633, center tap 615, the portion of winding 614 between the center tap and slider 612, the slider, conductor 634, switch contact 627, switching contact 623, and conductor 629. The voltage on inverter 617 is thus the sum of that supplied by receiver 91 and that between slider 612 and tap 615. The voltages are arranged to add in opposition, so that voltage divider 613 provides a rebalancing voltage for the circuit. Motor 600 operates to adjust slider 612 until the voltage on the inverter becomes zero. When this condition is reached, the position of slider 612 is a measure of the departure of the craft from the center of the course, as is the position of shaft 23.

Since most of the components of Figures 3 and 4 have been explained in detail in my copending application previously referred to, and do not of themselves form a part of the present invention, the explanation will not be repeated. Transformer secondaries 104, 105, 106, 110, 112, 113, and 114, voltage dividers 140, 141, 151, 167, 173, 252, and 264, switches 156, 157, 163, 257, and 260, motors 180 and 275, amplifiers 181 and 277, indicators 47 and 61, rectifier 187, selector 26 including the telemetric transmitter and receiver, and actuator 81 all form portions of the navigating computer of the earlier application. Filter 190, rate network 191, D. C. rebalance element 192, chopper 193, amplifier 194, discriminator 195, motor 196, voltage dividers 205 and 223, and secondary windings 107 and 111 all form portions of the azimuth coupling unit of the earlier application. Amplifiers 212, 236, 237, 240, and 384, motors 214, 241, 242, 243, and 382, gyroscopes 216 and 235, automatic pilot channels 231, 232, and 233, secondary windings 123 and 124, voltage dividers 365, 372, and 375, bellows 367, throttle 360, and throttle lever 361 all form portions of the automatic pilot of the previous application. Secondary windings 115, 116, 117, 120, 121, and 122, voltage dividers 270, 285, 302, 321, 341, 354, and 310, fixed resistors 324, 325, 326, and 344, motors 294 and 333, amplifiers 292 and 330, velocity generator 287, and indicator 74 all form portions of the off-schedule distance computer of the previous application. Nevertheless it is felt that complete depiction of this apparatus is essential to a proper disclosure of the present invention, because much of the apparatus presented schematically in Figure 2 herein is not known elsewhere than in my prior application.

The novelty which makes the present application inventive over that previously disclosed centers in coupler 22 and mechanical connection 97 thereto, secondary winding 122, voltage divider 354, and switches 345 and 75, all detailed in Figure 4.

These components become operative when actuator 81 is advanced to its final position. In all other positions of the actuator sliders 145 and 146 of Figure 3 are actuated in accordance with the angle $(90°+C_1-B)$, slider 143 in accordance with $d$, slider 152 in accordance with $x_n$, switch 163 in accordance with $x_t$, slider 253 of Figure 4 in accordance with $y_n$, and slider 286 in accordance with $V$. Sliders 170 and 174 are automatically adjusted in accordance with $x_d$, sliders 265 and 271 in accordance with $y_p$, sliders 303 and 307 in accordance with $y_t$, and sliders 322 and 340 in accordance with $y_d$. The course of the craft is adjusted in accordance with $x_d$ by motor 196 and its airspeed is adjusted in accordance with $y_d$ by motor 382. Full details of the operation of the apparatus here described are given in my copending application.

When the craft reaches the point $P_0$, which is a "way point," indicator 61 energizes actuator 81 from source E, just as at any other "way point." The apparatus is set up so that the actuator operates to advance switches 156, 157, 257, 260, 345, 624 and 625 to their most clockwise positions, as well to tune interrogator 34 to the frequency of the responder at $T_0$, and to tune receiver 91 to the localizer and glide path transmitters at $T_0$. Switch 163 must be set manually at its center position. By these adjustments, $d$ in Equation 3 is made the distance from $T_0$ to the craft, $\alpha$ is substituted for B, and $x_n$, $x_t$, and C are made zero. Equation 3 may be rewritten $$x_d = d \cos (90°-\alpha) = d \sin \alpha \qquad (5)$$

and a signal of this magnitude is supplied to motor 196 to control the heading of the craft.

Movement of switch 345 into its most clockwise position isolates the normal airspeed portion of the navigating computer from the throttle control apparatus, so that the position of slider 364 and lever 361 is determined solely by sliders 371 and 376. The craft's airspeed is hence stabilized at a selected value. These conditions prevail during all the bracketing and initial approach portions of the instrument landing.

When the craft nears the center of the glide path, switch 75 is closed upwardly, connecting voltage divider 354 in the throttle control circuit. Normal control of the throttle is now modified by the glide path signal, reducing the airspeed when the craft is above the beam and increasing the airspeed when the craft is below it.

It should be emphasized as one of the advantages of my invention that the craft control in azimuth operates through identical components in the computer and the coupler, regardless of whether the signal is from the omnidirectional range or from the localizer receiver. A second advantage lies in the use of computing elements already in the navigating computer for determining $d \sin \alpha$, instead of providing independent computing means for performing this function.

Figure 7:
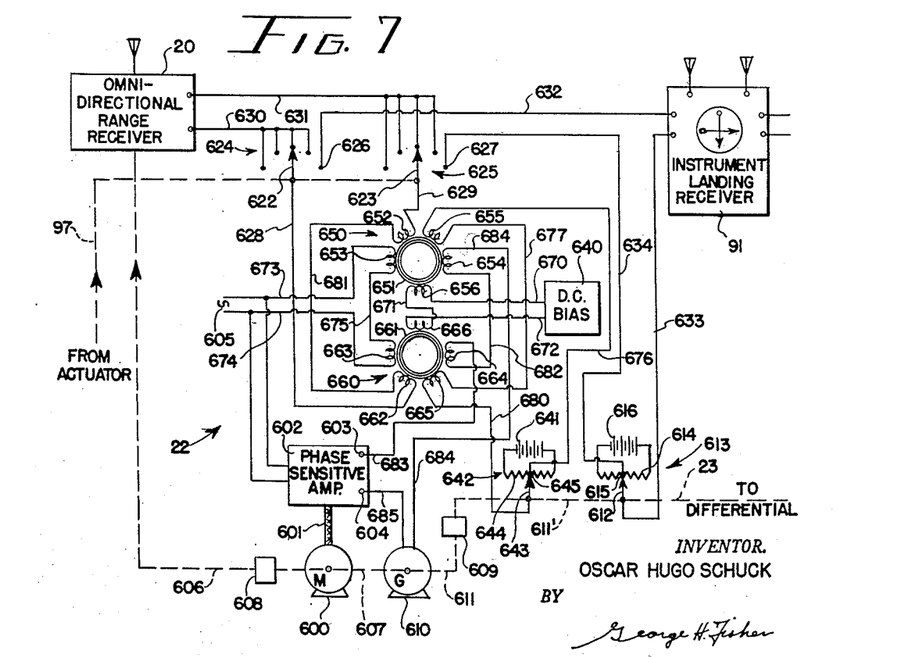
Figure 7 shows a modification of a portion of Figure 6.

Figure 7 is a modification of Figure 6 in which a transformer system is substituted for inverter 617. The transformer system includes a D. C. bias source 640, a source 641 of balancing D. C., a voltage divider 642 having a slider 643 and a winding 644 center tapped at 645, and a pair of transformers 650 and 660. Each transformer comprises a core of magnetic material carrying five windings. Thus transformer 650 includes core 651 carrying D. C. input winding 652, A. C. input winding 653, A. C. output winding 654, balancing winding 655, and bias winding 656, and transformer 660 includes core 661 carrying D. C. input winding 662, A. C. input winding 663, A. C. output winding 664, balancing winding 665, and bias winding 666.

Bias windings 656 and 666 are energized in series from source 640 through conductor 670, 671 and 672. A. C. input windings 653 and 663 are energized in series from source 605 through conductors 673, 675 and 674. Balancing windings 655 and 665 are connected in series to center tap 645 and slider 643 of voltage divider 642 by conductors 676, 677 and 680. Slider 643 is arranged for movement by motor 600 through mechanical connection 611, and the winding is energized from source 641. D. C. input windings 652 and 662 are connected in series to switching arms 622 and 623 by conductors 628, 681, and 629. A. C. output windings 654 and 664 are connected in series by conductor 682: these windings form a part of the input circuit of amplifier 602, which may be traced from terminal 603 through conductor 683, winding 664, conductor 682, winding 654, conductor 684, velocity generator 610, and conductor 685 to terminal 604.

The overall operation of this apparatus is the same as in Figure 6. The detailed operation of transformers 650 and 660 and associated parts is new, however, and will now be described. When an alternating voltage is impressed on one winding of a transformer, current flows in the winding, creating an alternating magnetic flux in the core which in turn creates an alternating voltage across any other winding on the core. The secondary voltage thus created is determined, other things being equal, by the flux in the core, which in turn is determined by the permeability of the core.

It has been found that if a transformer is provided with an additional winding in which a unidirectional "biasing" current flows, the permeability $\mu$ of the core, and hence the secondary voltage resulting from a given primary voltage, varies with the unidirectional current $ki$ as shown in Figure 8. By selection of a suitable alloy for use in the transformer core, this effect may be made quite large.

Assume now that no voltage is on switching contacts 622 and 623 and that slider 643 is at center tap 645. Bias source 640 is adjusted to establish the permeability condition represented by point A, Figure 8, in both the transformers, and a small alternating voltage is applied to primary windings 653 and 663. Transformers 650 and 660 are identical, so that equal output voltages appear across windings 654 and 664. The windings are connected so that these voltages oppose, and under the present conditions exactly neutralize one another, so that no voltage appears between conductors 683 and 684.

Now suppose a small D. C. signal voltage appears between the switching contacts. This voltage is applied to transformers 650 and 660 in opposite senses, compared to the bias voltage, and causes current in windings 652 and 662: the current acts in one of the transformers to aid that from bias source 640 in creating flux lines, and in the other of the transformers to oppose that from source 640. Accordingly the condition in one transformer, say 650, changes to that shown at B in Figure 8, while in the other transformer the condition changes to that shown at C. For the same input alternating voltage, transformer 650 therefore gives a greater output voltage and transformer 660 gives a smaller one. The resultant of these two voltages appears on conductors 683 and 684, and energizes amplifier 602 to cause operation of motor 600.

Operation of the motor moves slider 643 away from center tap 645, and a direct current accordingly flows in balancing coils 655 and 665. The flux due to this current opposes that due to the signal voltage, returning transformers 650 and 660 to condition A in Figure 8. When this condition is regained, the voltage on amplifier 602 is again zero, and the motor stops. Antihunt properties are given to the circuit by velocity generator 610, as is well known.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangements of parts, within the principle of the invention, to the full extent indicated by the broad general meaning of the terms in which the appended claims are expressed.

I claim as my invention:

1. Apparatus of the class described, comprising, in combination: means providing first signals in response to the bearing and distance of a dirigible craft from a fixed point, means providing second signals in response to the distance of the craft from a further fixed point and to the angular displacement of the craft from a selected line through the further point; computing means normally connected to said first named means to derive from said first signals a control signal indicative of displacement of the craft from a predetermined path passing through a destination; means stabilizing the heading of the craft; means altering the operation of said stabilizing means in accordance with said control signal, to normally maintain the craft on the predetermined path, and means connected to both said signal providing means and to said computing means, and operable to substitute said second signals for said first signals, and to modify said computing means to give a signal indicative of departure of the craft from the selected line, so that the craft is maintained on the selected line.

2. Apparatus of the class described, comprising, in combination: means providing first signals in response to characteristics of the location of a dirigible craft with respect to at least one fixed point; means providing second signals in response to the distance of the craft from a further fixed point and to the angular displacement of the craft from a selected line through the further point; computing means normally connected to said first named means to derive from said first signals a control signal indicative of displacement of the craft from a predetermined path passing through a destination; means stabilizing the heading of the craft; means altering the operation of said stabilizing means in accordance with said control signal, to normally maintain the craft on the predetermined path; and means operable upon one of said first signals reaching a predetermined value to substitute said second signals for said first signals, and to modify said computing means to give a signal indicative of departure of the craft from the selected line, so that the craft is maintained on the selected line.

3. Apparatus of the class described comprising, in combination: a computer including a first component adjustable in accordance with the value of an angular quantity to give a first output which is a trigonometric function of said angular quantity, at least one further component adjustable in accordance with the value of an algebraic quantity to give a second output which is a linear function of said algebraic quantity, and means combining said outputs to supply a signal; craft control means connected to said computer and energized with said signal for controlling the direction of movement of a dirigible craft in accordance therewith; means connected to said computer for normally adjusting said first component in accordance with the bearing of the craft from a fixed point, and means connected to said computer for normally adjusting said further component in accordance with the distance from said fixed point to a first path which the craft is to follow, so that said signal is a measure of the departure of the craft from the first path, whereby the craft is caused to follow said first path; means responsive to the angular displacement of the craft from a second path, measured at a point located on said path; and means connected to said computer and said responsive means for reducing said second output to zero and for causing re-adjustment of said first named component in accordance with the response of said responsive means, so as to cause the craft to follow said second path.

4. Apparatus of the class described comprising, in combination: means supplying a first signal proportional to the bearing of a craft from a first radio transmitter having a first transmission characteristic; means supplying a second signal proportional to the distance of the craft of a second radio transmitter having a second transmission characteristic; means supplying a third signal proportional to the departure of the craft from a selected glide path established in space by a third radio transmitter, computing means connected to the first and second named means to derive from said first and second signals a first control signal indicative of deviation of the craft from a predetermined schedule and a second control signal indicative of the distance of the craft from a selected point; means adjustable to vary the airspeed of the craft; means normally connecting said last named means to said computing means for adjustment in accordance with said first control signal; and means disconnecting said airspeed varying means from said computing means and connecting it to said means supplying said third signal, for adjustment in accordance with said third signal.

5. Apparatus of the class described comprising, in combination: means supplying a first signal proportional to the bearing of a craft from a first radio transmitter having a first transmission characteristic; means supplying a second signal proportional to the distance of the craft of a second radio transmitter having a second transmission characteristic; means supplying a third signal proportional to the departure of the craft from a selected glide path established in space by a third radio transmitter; computing means connected to the first and second named means to derive from said first and second signals a first control signal indicative of deviation of the craft from a predetermined schedule and a second control signal indicative of the distance from the craft to a selected point; means adjustable to vary the airspeed of the craft; means normally connecting said last named means to said computing means for adjustment in accordance with said first control signal; means disconnecting said airspeed varying means from said computing means; and means causing operation of said disconnecting means when said second control signal becomes zero.

6. Apparatus of the class described comprising, in combination: means supplying a first signal proportional to the bearing of a craft from a first radio transmitter having a first transmission characteristic; means supplying a second signal proportional to the distance of the craft of a second radio transmitter having a second transmission characteristic; means supplying a third signal proportional to the departure of the craft from a selected glide path established in space by a third radio transmitter; computing means connected to the first and second named means to derive from said first and second signals a first control signal indicative of deviation of the craft from a predetermined schedule and a second control signal indicative of the distance from the craft to a selected point; means adjustable to vary the airspeed of the craft; means normally connecting said last named means to said computing means for adjustment in accordance with said control signal; means disconnecting said airspeed varying means from said computing means and connecting it to said means supplying said third signal, for adjustment in accordance with said third signal; and means causing operation of said disconnecting means when said second control signal becomes zero.

7. Apparatus of the class described, in combination: means giving a first output representative of the angle between a standard direction and the direction of the axis of ordinates of a Cartesian coordinate system, which axis is parallel to an initial course to be followed by a dirigible craft; means giving a second output representative of the abscissa of said course in said system; means giving a third output representative of the abscissa of the location of a selected point adjacent said course; means giving a fourth output representative of the angle between said standard direction and the direction of the craft from said selected point; means giving a fifth output representative of the angular displacement of the craft, at a control point, from a selected landing path through said control point; adjustable means stabilizing the heading of the craft; computing means normally connected to receive said first, second, third and fourth outputs to derive therefrom an output representative of the lateral displacement of the craft from said course; adjustable means stabilizing the heading of the craft; means connecting said computing means to said adjustable means for adjusting the same in accordance with the output of said computing means; and means operable to substitute said fifth output for said fourth output and to reduce said first, second, and third outputs to zero.

8. Apparatus of the class described comprising in combination: means giving a first output representative of the angle between a standard direction and the direction of the axis of ordinates of a Cartesian coordinate system, of which the axis of abscissas is perpendicular at a known point to an initial course to be followed by a dirigible craft; means giving a second output representative of the scheduled distance of the craft from said axis of abscissas; means giving a third output representative of the ordinate of the location of a selected point adjacent said course; means giving a fourth output representative of the angle between said standard direction and the direction of the craft from said selected point; computing means normally connected to receive said first, second, third, and fourth outputs to derive therefrom an output representative of the deviation of the craft from scheduled movement along said course; adjustable means stabilizing the power of the craft; means connecting said computing means to said adjustable means for adjusting the same in accordance with the output of said computing means; and means operable when the output of said computing means reaches a predetermined value to disconnect said adjustable means from said computing means.

9. Apparatus of the class described comprising in combination: means giving a first output representative of the angle between a standard direction and the direction of the axis of ordinates of a Cartesian coordinate system, of which the axis of abscissas is perpendicular at a known point to an initial course to be followed by a dirigible craft; means giving a second output representative of the ordinate of the location of a selected point adjacent said course; means giving a third output representative of the angle between said standard direction and the direction of the craft from said selected point; computing means normally connected to receive said first, second, and third outputs to derive therefrom an output representative of the distance from the craft to said axis of abscissas; adjustable means stabilizing the power of the craft; means connecting said computing means to said adjustable means for adjusting the same in accordance with the output of said computing means; and means operable when the output of said computing means reaches a predetermined value to disconnect said adjustable means from said computing means.

10. Apparatus of the class described comprising in combination: means giving a first output representative of the angle between a standard direction and the direction of the axis of ordinates of a Cartesian coordinate system, of which the axis of abscissas is perpendicular at a known point to an initial course to be followed by a dirigible craft; means giving a second output representative of the abscissa of said course on said axis; means giving a third output representative of the scheduled distance of the craft from said known point; means giving fourth and fifth outputs representative of the abscissa and ordinate respectively of the location of a selected point adjacent said course; means giving a sixth output representative of the angle between said standard direction and the direction of the craft from said selected point; means giving a seventh output representative of the angular displacement of the craft, at a control point, from a selected landing path passing through said control point; computing means normally connected to receive said first, second, third, fourth, fifth and sixth signals to derive from said first, second, fourth, and sixth outputs a first control output representative of the lateral displacement of the craft from said course, to derive from said first, fifth and sixth outputs a second control output representative of the distance of the craft from said axis of abscissas, and to derive from said first, third, fifth and sixth outputs a third control output representative of departure of the craft from a schedule; first adjustable means stabilizing the heading of the craft; second adjustable means stabilizing the power of the craft; means connecting said computing means to both said adjustable means for adjusting the same in accordance with said first and second control outputs respectively; and means connected to said computing means and operative when said second control output reaches a predetermined value to substitute said seventh output for said sixth output, to reduce said first, second and fourth outputs to zero, and to disconnect the second named adjusting means from said computing means.

11. Apparatus for performing a control function either in accordance with the sine of a first continuously variable angle, or in accordance with the cosine of a second angle which is the difference between a constant angle and a second continuously variable angle, said constant angle being the sum of 90° added to a settable angle, comprising, in combination: control means for performing a function in accordance with a signal; computer means connected to said control means for supplying thereto a signal which varies as a cosine function of an angle 90° greater than the difference between first and second angular inputs thereto; first adjustable means connected to said computer means for supplying thereto a first angular input; second adjustable means connected to said computer means for supplying thereto a second angular input; means connected to both said adjustable means for normally adjusting both said adjustable means so that said first input has the desired value of a settable angle and so that said second input varies with the second continuously variable angle; and means in said last named means operable to reduce said first angular input to zero and to cause said second input to vary in accordance with the first continuously variable angle rather than in accordance with the second continuously variable angle.

References Cited in the file of this patent

UNITED STATES PATENTS

| | | |
|---|---|---|
| 2,264,056 | Thacker et al. | Nov. 25, 1941 |
| 2,310,955 | Hornfeck | Feb. 16, 1943 |
| 2,322,225 | Crane et al. | June 22, 1943 |
| 2,401,168 | Kronenberger | May 28, 1946 |
| 2,472,129 | Streeter | June 7, 1949 |
| 2,499,349 | Ayres | Mar. 7, 1950 |
| 2,540,076 | Dicke | Feb. 6, 1951 |
| 2,541,277 | Omberg et al. | Feb. 13, 1951 |
| 2,552,511 | Barrow | May 15, 1951 |
| 2,569,328 | Omberg | Sept. 25, 1951 |
| 2,592,173 | Noxon et al. | Apr. 8, 1952 |
| 2,594,326 | MacCallum | Apr. 29, 1952 |
| 2,599,889 | Biggs | June 10, 1952 |
| 2,612,331 | Frazier et al. | Sept. 30, 1952 |
| 2,613,350 | Kellogg | Oct. 7, 1953 |

FOREIGN PATENTS

| | | |
|---|---|---|
| 592,766 | Great Britain | Sept. 29, 1947 |